*(12)* United States Patent
Fiske et al.

(10) Patent No.: US 9,726,391 B2
(45) Date of Patent: Aug. 8, 2017

(54) VENTILATION DEVICES AND METHODS

(71) Applicant: PAX WATER TECHNOLOGIES, INC., Richmond, CA (US)

(72) Inventors: Peter Fiske, Oakland, CA (US); Robin Giguere, San Francisco, CA (US); Ethan Brooke, Berkeley, CA (US)

(73) Assignee: PAX Water Technologies Inc., Richmond, CA (US)

( * ) Notice: Subject to any disclaimer, the term of this patent is extended or adjusted under 35 U.S.C. 154(b) by 769 days.

(21) Appl. No.: 14/105,182

(22) Filed: Dec. 13, 2013

(65) Prior Publication Data

US 2015/0167993 A1    Jun. 18, 2015

(51) Int. Cl.
*E04H 12/00* (2006.01)
*F24F 7/02* (2006.01)

(52) U.S. Cl.
CPC ..................................... *F24F 7/02* (2013.01)

(58) Field of Classification Search
None
See application file for complete search history.

(56) References Cited

U.S. PATENT DOCUMENTS

| | | |
|---|---|---|
| 1,565,593 A | 12/1925 | Sausen |
| 3,401,621 A | 9/1968 | Aaberg |
| 3,669,349 A | 6/1972 | Hall, Jr. |
| 3,759,496 A | 9/1973 | Teller |
| 3,802,327 A | 4/1974 | Otsuka |
| 4,102,658 A | 7/1978 | Jarvenpaa |
| 4,373,576 A | 2/1983 | Strupczewski |
| 4,578,455 A | 3/1986 | Pipper et al. |
| 4,635,672 A | 1/1987 | Baker |
| 4,737,293 A | 4/1988 | Walterick, Jr. et al. |
| 4,963,329 A | 10/1990 | Burgess et al. |
| 4,976,895 A | 12/1990 | Bardo |
| 5,004,484 A | 4/1991 | Stirling |
| 5,039,423 A | 8/1991 | Kelley |

(Continued)

FOREIGN PATENT DOCUMENTS

| | | |
|---|---|---|
| EP | 2053317 A1 | 4/2009 |
| EP | 2469166 A1 | 6/2012 |

(Continued)

*Primary Examiner* — Christopher P Jones
*Assistant Examiner* — Phillip Shao
(74) *Attorney, Agent, or Firm* — The Webb Law Firm (57) ABSTRACT

Devices are provided for ventilating and/or removing volatile chemicals from liquid (e.g. water) stored in a liquid-containing storage tank (e.g. water-storage tank). The devices include a first fluid flow path that is physically isolated from a second fluid flow path and a convection device for moving a first fluid along the first fluid flow path toward at a desired destination and for exhausting the first fluid at the desired destination at a desired velocity. Methods are also provided for ventilating and/or removing volatile chemicals from liquid (e.g. water) stored in liquid-containing storage tanks (e.g. water-storage tanks). The methods involve blowing a first fluid through a ventilation device into a liquid-containing storage device at a velocity sufficient to achieve a desired mass transfer rate of volatile chemicals from the liquid in the liquid-containing storage device to air in the headspace and flowing the contaminated air back through the ventilation device.

8 Claims, 8 Drawing Sheets

(56) References Cited

U.S. PATENT DOCUMENTS

| | | |
|---|---|---|
| 5,057,125 A | 10/1991 | Lankton et al. |
| 5,122,165 A | 6/1992 | Wang et al. |
| 5,122,166 A * | 6/1992 | Hyrcyk ............... B01D 19/0005 |
| | | 210/631 |
| 5,220,881 A | 6/1993 | Sandor, Jr. |
| 5,259,931 A | 11/1993 | Fox |
| 5,322,596 A | 6/1994 | Arntz |
| 5,340,383 A | 8/1994 | Womack |
| 5,378,267 A * | 1/1995 | Bros ........................ B01D 3/22 |
| | | 96/168 |
| 5,782,262 A | 7/1998 | Kim |
| 6,071,189 A | 6/2000 | Blalock |
| 6,214,242 B1 | 4/2001 | Swensen |
| 6,277,175 B1 | 8/2001 | Halder et al. |
| 6,568,435 B2 | 5/2003 | Jaeger |
| 6,749,125 B1 | 6/2004 | Carson |
| 7,399,343 B2 | 7/2008 | Ramos De La Fuente |
| 7,510,170 B2 | 3/2009 | Huang |
| 8,109,489 B2 | 2/2012 | Maier |
| 2005/0172808 A1 | 8/2005 | Yi |
| 2006/0055068 A1 | 3/2006 | Kojima |
| 2012/0006759 A1 | 1/2012 | Brooke |
| 2013/0015133 A1* | 1/2013 | Brooke ............... B01F 3/04751 |
| | | 210/640 |
| 2013/0213584 A1* | 8/2013 | Duesel ................. B01D 1/0058 |
| | | 159/16.2 |

FOREIGN PATENT DOCUMENTS

| | | |
|---|---|---|
| JP | 487681 A | 3/1992 |
| JP | 7136405 A | 5/1995 |
| JP | H07136405 A2 | 5/1995 |
| JP | 04087681 A2 | 3/2004 |
| JP | 2008273601 A | 11/2008 |
| JP | 2012125700 A | 7/2012 |
| JP | 2012125700 A2 | 7/2012 |
| WO | 9519833 A1 | 7/1995 |
| WO | WO9519833 A1 | 7/1995 |
| WO | 2012091333 A2 | 7/2012 |
| WO | WO2012091333 A2 | 10/2012 |

* cited by examiner

VENTILATION DEVICES AND METHODS

FIELD OF THE DISCLOSURE

This disclosure relates to ventilation devices and methods. This disclosure also relates to ventilation devices and methods for removing volatile contaminants from water or other liquids.

BACKGROUND

Volatile contaminants such as Volatile Organic Compounds ("VOCs"), carbon dioxide ($CO_2$), hydrogen sulfide ($H_2S$) and radon may be found in drinking water, including in water stored in water storage tanks. VOCs and radon may be harmful to human health. Carbon dioxide and hydrogen sulfide may alter the chemistry of the water, such that additional water treatment may be necessary. For example, carbon dioxide lowers water pH resulting in some water treatment plants adding caustic soda to restore pH to acceptable levels. Hydrogen sulfide accelerates corrosion. The present disclosure relates, among other things, to devices and methods for removing VOCs and/or other volatile contaminants, such as carbon dioxide (CO2), hydrogen sulfide (H2S), and radon, from water stored in water storage tanks.

SUMMARY

The present disclosure relates to devices and methods for ventilating liquid-containing storage tanks, such as water-storage tanks, including devices and methods for removing volatile chemicals from stored liquid, such as water, in liquid-containing storage tanks.

In some embodiments, the devices include a first fluid flow path, a first fluid convection device for moving a first fluid along the first fluid flow path toward a destination and exhausting the first fluid at the destination at a desired velocity and in a desired direction, and a second fluid flow path which is physically isolated from the first flow path for facilitating moving a second fluid including volatile chemicals away from the destination. In some embodiments, the device is configured to intake the first fluid in a first direction and to exhaust the second fluid in second direction, and the first direction and second direction are not coplanar. In some embodiments, the destination is the air gap (also referred to as "headspace") in the interior of a water-storage tank. In further embodiments, the first fluid is outside air and the second fluid is air contaminated with volatile chemicals in the headspace of the water-storage tank. In some embodiments, the convection device is a centrifugal fan.

In some embodiments, the device includes a housing; a first fluid intake system that is at least partially in the housing; and, a second fluid exhaust system that is also at least partially within the housing and that is physically isolated from the first fluid intake system. The first fluid intake system includes a first fluid flow path which initiates at a first fluid entry port for allowing the first fluid to enter the device and terminates at a first fluid exit port for allowing the first fluid to exit the device in a desired direction. The first fluid intake system further includes a convection device from moving the first fluid along the first fluid flow path and exhausting the first fluid from the device at a desired velocity. In some embodiments, the desired velocity is sufficient to achieve a desired rate of mass transfer of volatile chemicals from the liquid in the liquid storage tank to air in the headspace of the liquid storage tank. In some embodiments, the desired rate of mass transfer is at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% greater than the rate of mass transfer in a similar liquid storage tank lacking forced ventilation. The second fluid exhaust system includes a second fluid flow path which initiates at a second fluid entry port which allows the second fluid to enter the device and terminates at a second fluid exit port which allows the second fluid to exit the device.

In some embodiments, the first fluid is outside air and the second fluid is air contaminated with volatile chemicals, and the desired velocity and desired direction are chosen to achieve a desired mass transfer rate of the outside air with volatile chemicals in water stored in a water-storage tank when the device is operatively attached to a water-storage tank. In some embodiments, the desired mass transfer rate is a mass transfer rate that is at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% greater than the mass transfer rate in a similar tank but which lacks any forced ventilation.

In some embodiments, the device further comprises a first fluid exit conduit having a first diameter protruding from the housing and a second fluid entry conduit having a second diameter that is larger than the first diameter of the first fluid conduit, and wherein the conduits are in a coaxial, concentric configuration with respect to one another. In some embodiments, the second fluid entry conduit may be an opening in the device housing. In some embodiments the second fluid entry conduit may also protrude from the housing but to a lesser degree than the first fluid exit conduit. In some embodiments, the housing includes a body and an exhaust hood, in which the exhaust hood includes a rain shield enclosed within a frusto-conical shaped chamber.

In some embodiments, the methods involve using ventilation devices according to this disclosure to remove volatile contaminants from water-storage tanks. In some embodiments, the methods involve attaching a ventilation device to a water-storage tank such that the first fluid exhaust port and the second fluid entry port are located within a water-storage tank, for example in the air gap of a water storage tank, and the first fluid entry port and second fluid exhaust port are located outside the water-storage tank. In some embodiments, the methods involve engaging the convection device in the ventilation device when the ventilation device is operatively attached to a water-storage tank. Accordingly, outside air moves through the housing and is injected into the water storage tank toward the water surface at a velocity and in a direction which achieves a desired rate of mass transfer of volatile contaminants from the liquid into the headspace (for example, outside air is injected toward the water surface at a velocity and in a direction that achieves a desired increase in the rate of mass transfer relative to the rate of mass transfer in a water storage tank lacking forced ventilation). Air, which may be now contaminated with volatile contaminants is exhausted from the water-storage tank by flowing through the ventilation device from the second fluid entry port to the second fluid exit port. In some embodiments, the methods involve attaching a ventilation device according to this disclosure to a water-storage tank and engaging the convection device in the ventilation device.

In some embodiments, the methods involve removing volatile chemicals from liquid stored in a liquid-containing storage tank (such as removing volatile chemicals from water stored in a water-storage tank) by blowing outside air through a ventilation device along an outside air flow path and into the liquid-containing tank at a desired velocity and in a desired direction, and removing volatile chemicals from the liquid-containing tank through the ventilation device along a volatile chemical flow path, wherein the outside air flow path and the volatile chemical flow path are physically isolated from one another and wherein the desired direction and desired velocity are chosen to achieve a desired rate of mass transfer of volatile chemicals from the liquid to the air at the air-liquid interface in the liquid-containing storage tank, such as a desired increase in the rate of mass transfer of volatile chemicals relative to a similar liquid-containing storage tank lacking forced ventilation. In some embodiments, the device intakes outside air in a direction that is not coplanar with the direction it exhausts air contaminated with volatile chemicals (for example the device intakes air horizontally and exhausts air vertically).

The identified embodiments are exemplary only and are therefore non-limiting. The details of one or more non-limiting embodiments of the invention are set forth in the accompanying drawings and the descriptions below. Other embodiments of the invention should be apparent to those of ordinary skill in the art after consideration of the present disclosure.

BRIEF DESCRIPTION OF THE DRAWINGS

Non-limiting ventilation systems and methods are described with reference to the following figures. The same numbers may be used throughout the figures to reference like features and components.

DESCRIPTION

In the following detailed description, reference is made to the accompanying drawings, which form a part hereof, and within which are shown by way of illustration certain embodiments by which the subject matter of this disclosure may be practiced. It is to be understood that other embodiments may be utilized and structural changes may be made without departing from the scope of the disclosure. In other words, illustrative embodiments and aspects are described below. But it will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such development effort might be complex and time-consuming, but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that don't negatively impact the intended purpose. Descriptive terms are implicitly understood to be modified by the word substantially, even if the term is not explicitly modified by the word substantially.

The phrase "increase the mass transfer rate of volatile chemicals into the headspace" or the like means: increase the mass transfer rate of volatile chemicals into the headspace of a storage tank outfitted with a ventilation device according to this disclosure relative to a similar storage tank lacking forced ventilation. In some embodiments, the mass transfer rate may increase by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% as compared to the mass transfer rate of a similar storage tank lacking forced ventilation.

The phrase "volatile contaminants" includes VOCs such as chloroform, bromoform, and trichloroethylene (TCE), as well as radon, carbon dioxide and hydrogen sulfide. Embodiments according to this disclosure may ventilate one, some or all of the volatile contaminants present in the liquid in the liquid-storage tank regardless of whether the description refers to volatile contaminants generally or certain volatile contaminants specifically.

The present disclosure relates to devices and methods for ventilating liquid-containing storage tanks such as water-storage tanks. The present disclosure also relates to ventilation devices and methods useful for removing volatile contaminants from liquid, such as water, stored in the liquid-containing storage tanks. In general, the devices comprise: a first fluid flow path and a first fluid convection device for moving a first fluid along the first fluid flow path toward a destination and for exhausting the first fluid from the ventilation device at a first fluid exhaust port at a desired speed and in a desired direction; and, a second fluid flow path configured to permit a second fluid to flow away from the destination into the ventilation device through a second fluid entry port. In some embodiments, the first fluid flow path and the second fluid flow path are physically isolated. In some embodiments, the first fluid path and second fluid path are configured such that the stream of first fluid entering the ventilation device and the stream of second fluid exiting the ventilation device are not co-planar. In some embodiments, the first and second fluid flow paths are both physically isolated and provide for a first fluid entry stream and a second fluid exit stream which are not co-planar. In some embodiments, the first fluid exhaust port and the second fluid entry port are in a concentric configuration with respect to one another In some embodiments, the device includes a housing which defines the two physically isolated fluid flow paths, and/or a first fluid flow path and a second fluid flow path which are configured such that the stream of first fluid entering the ventilation device and the stream of second fluid exiting the ventilation device are not co-planar. In some embodiments, the first fluid is outside air (e.g. air drawn into the ventilation device from outside the ventilation device) and the second fluid is air contaminated with or laden with volatile chemicals. For example, the second fluid can be air from the headspace of a liquid-storage tank, which air is contaminated with volatile chemicals that have transferred from liquid stored in the tank to the air in the headspace, for example due to increased mass transfer of the volatile chemicals from the liquid to the air as a result of the first fluid being exhausted by the ventilation device at a desired speed and at a desired direction relative the air/liquid interface in the tank. However, the first fluid can be any gas which is free of volatile chemicals, or is relatively free of volatile chemicals, or has sufficiently few volatile chemicals such that mass transfer of volatile chemicals occurs from the liquid to the gas at the destination.

In some embodiments, when operationally attached to a liquid-containing storage tank, the ventilation device: delivers fresh air (e.g. outside air) to the liquid-containing storage tank at a desired speed by moving it through the ventilation device along the first fluid flow path using the convection device; and, the ventilation device also facilitates removal of volatile chemicals from the liquid-containing storage tank by exhausting the volatile chemicals from the storage tank along the second fluid flow path. In some embodiments, the ventilation device delivers outside air into the liquid-storage tank in a desired direction relative to the air-liquid interface in the tank (for example, substantially perpendicular, or from about 30 degrees to about 90 degrees, or from about 45 degrees to about 90 degrees, relative to the surface of the liquid in the tank) and at a desired velocity (for example, to achieve a desired mass transfer rate facilitating the removal of volatile chemicals within the liquid in the tank).

Figure 1:
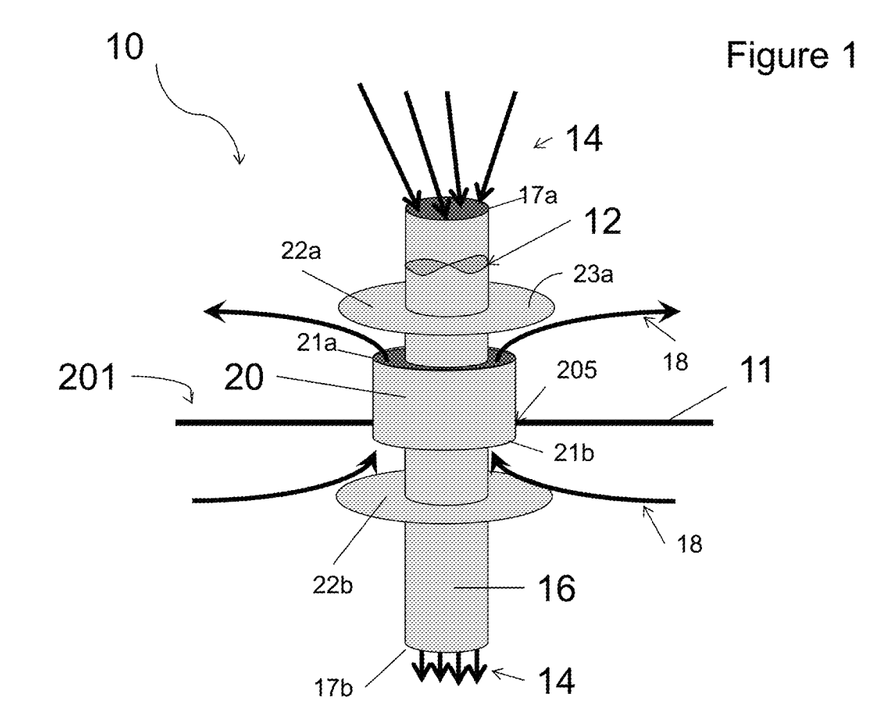
FIG. 1 is a schematic illustration of an embodiment of a ventilation device in accordance with an embodiment of this disclosure.

Referring now to the Figures, FIG. 1 is a partial schematic illustration of an embodiment of a ventilation device 10 consistent with this disclosure, installed in a liquid containing storage tank 201. The ventilation device 10 may be used to facilitate ventilation of volatile contaminants present in liquid-storage tanks, such as water-storage tanks.

The device 10 of FIG. 1 includes: a convection device 12, such as a fan, for moving a first fluid along a first fluid flow path 14; and, two coaxial, concentrically configured conduits 16, 20. The first fluid flow path 14, along which the first fluid (for example outside air) moves through the ventilation device 10 and toward a desired destination (for example into the headspace in a liquid-containing storage tank such as a water storage tank), is at least partly defined by the first conduit 16. A second fluid flow path 18, along which a second fluid (for example air containing volatile chemicals) moves away from the desired destination, is at least partly defined by the second conduit 20. The first fluid (e.g. outside air) flow path 14 and the second fluid (e.g. volatile contaminant) flow path 18 are physically isolated by top and bottom path dividers 22a, 22b. More specifically, the top and bottom ends 21a, 21b of the second (e.g. volatile contaminant) conduit 20 are located between the top and bottom path dividers 22a, 22b, whereas the top end 17a of the first (e.g. outside air) conduit 16 extends above the top surface 23a of the top divider 22a and the bottom end 17b of the first (e.g. outside air) conduit 16 extends below the bottom surface 23b of the bottom divider 22b.

The ventilation device 10 may be installed on a top surface 11 of a liquid-containing storage tank 201, for example water-storage tank. More specifically, the liquid-containing storage tank 201 is fitted with an opening 205 for receiving the ventilation device 10 such that both the bottom end 17b of the first conduit 16 and the bottom end 21b of the second conduit 20 are located inside the liquid-containing tank 201 and both the top end 17a of the first conduit 16 and top end 21a of the second conduit 20 are located outside the liquid-containing tank 201. Installed in this manner, the top end 17a of the first conduit 16 serves as a first fluid (in this case, outside air) intake port and defines the start of the first fluid flow path (in this case, the outside air flow path) 14 and the bottom end 17b of the first conduit 16 serves as the first fluid exhaust port (in this case, the outside air exhaust port) and defines the end of the outside air flow path 14. And, the bottom end 21b of the second conduit 20 serves as a second fluid (in this case, volatile chemical) intake port and defines the start of the second fluid flow path (in this case, volatile contaminant flow path) 18 and the top end 21a of the second conduit 20 serves as the second fluid exhaust port (in this case, volatile chemical exhaust port) and defines the end of the volatile contaminant flow path 18. The ventilation device 10 may be installed by any means known in the art, for example such as being bolted to a circular raised flange, which flange is welded to the tank or attached atop an opening cut into the roof of a tank and attached with bolts, screws and/or magnetic fixtures.

When operationally attached to the water-storage tank, and when the convection device 12 is engaged (for example, the fan is turned on), outside air is drawn into the outside air flow path 14 at the top end (intake port) 17a of the first conduit 16 and exhausted into the liquid-storage container 201 at the bottom end (exhaust port) 17b of the first conduit 16 by the convection device 12. Without wishing to be bound by theory, it is believed that injection of outside air into the liquid-containing tank at a desired velocity and in a desired direction increases mass transfer of volatile chemicals between the liquid and gas. That is, it is believed that downward blowing (for example, air is directed at the air/liquid interface at any angle including a substantial perpendicular component such as from 30 degrees to 90 degrees relative to the surface of the liquid) increases the velocity of air at the air/water interface, which reduces the thickness of the boundary layer and increases the rate of mass transfer out of the liquid (e.g. water) into the air. Air, now contaminated with volatile chemicals, flows into the bottom end (volatile contaminant intake port) **21*b* of the second conduit 20, along the volatile contaminant flow path 18, and out of the ventilation device at the top end 21*a***

(volatile contaminant exhaust port) of the second conduit 20. Further, in the examples herein, the stream of the first fluid entering the ventilation device and the stream of second fluid exiting the ventilation device are not co-planar (e.g. air is pulled in along a horizontal plane, and air is exhausted vertically out the top of the device), eliminating or mitigating the risk of "short circuiting" the device (i.e. if the intake and exhaust streams were co-planar, a prevailing wind in a certain direction could cause the stream of exhaust air to be blown back into the path of the inlet air).

Figure 2:
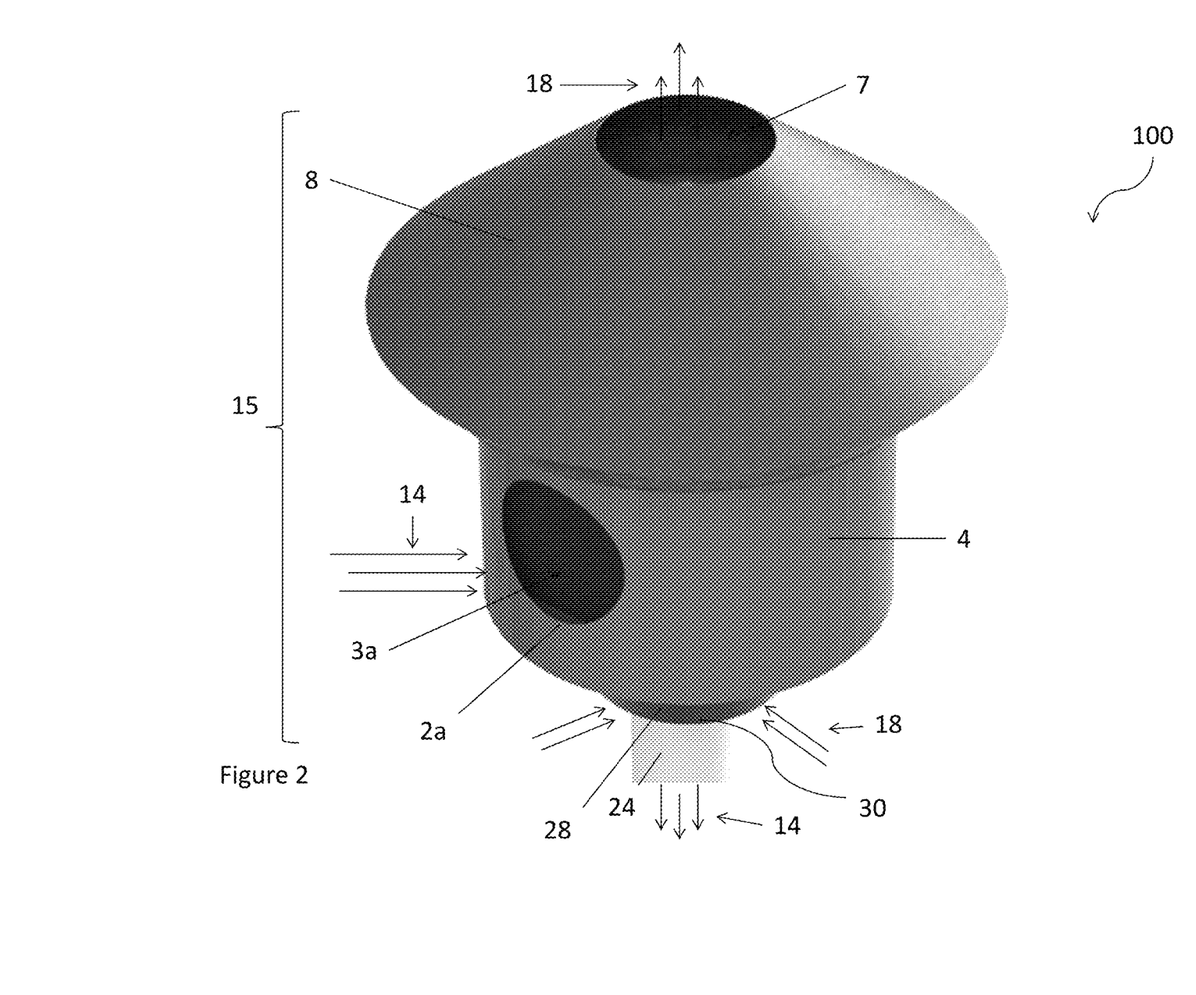
FIG. 2 is a perspective view of a ventilation device in accordance with an embodiment of this disclosure.
Figure 9:
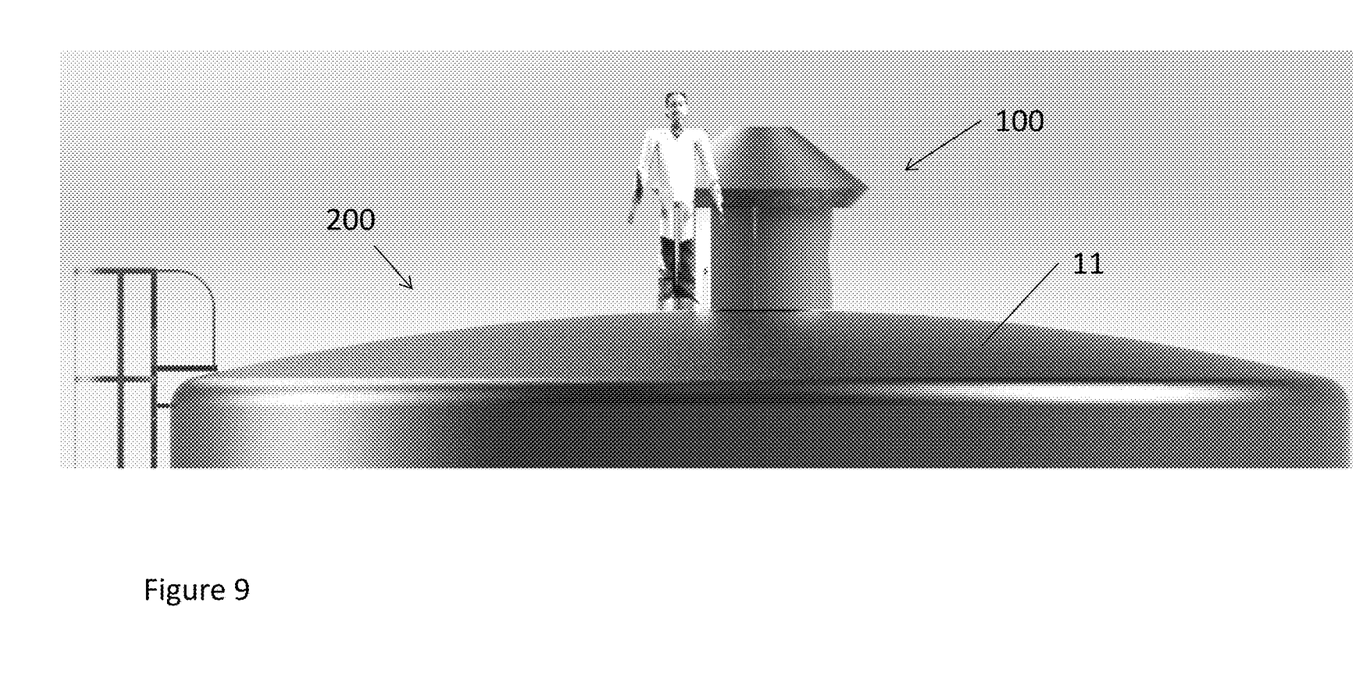
FIG. 9 is a perspective view of the ventilation device of FIG. 2 installed on water-storage tank.

FIG. 2 is a perspective schematic illustration of another embodiment of a ventilation device 100 consistent with this disclosure. This ventilation device 100 may also be used to facilitate ventilation of volatile contaminants present in liquid-storage tanks, such as water-storage tanks. FIG. 9 is an illustration of ventilation device 100 in operational attachment with a potable water-storage tank 200.

Figure 3:
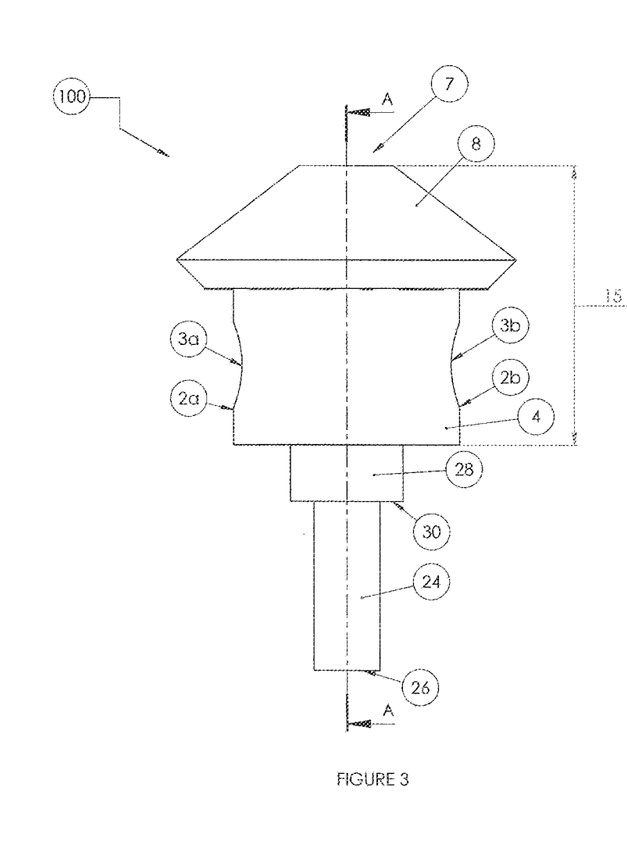
FIG. 3 a side view of the ventilation device of FIG. 2
Figure 5:
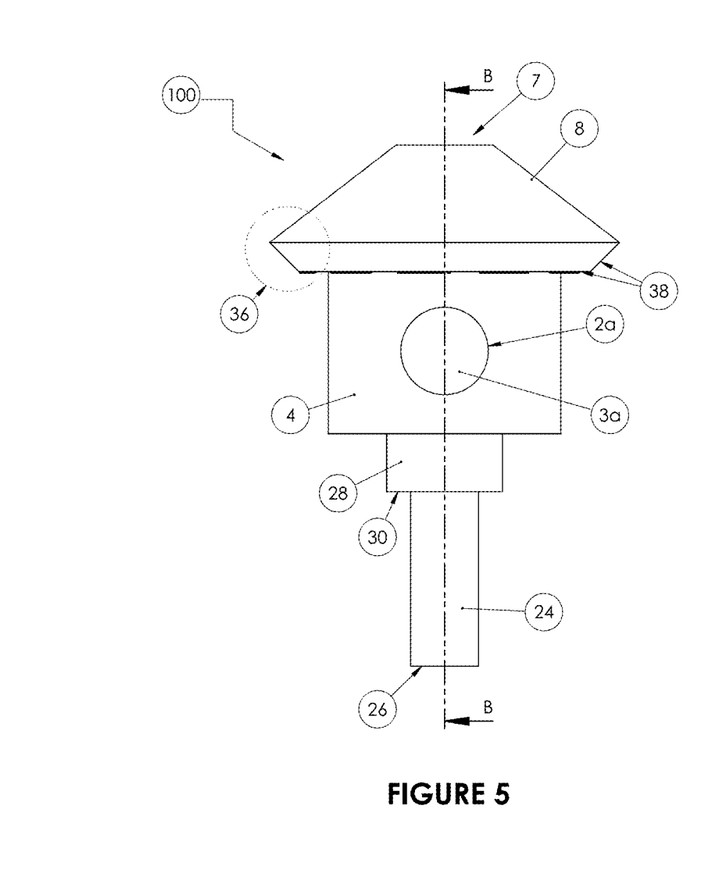
FIG. 5 is another side view of the ventilation device of FIG. 2 taken at a ninety degree rotation from the view of FIG. 3.
Figure 8:
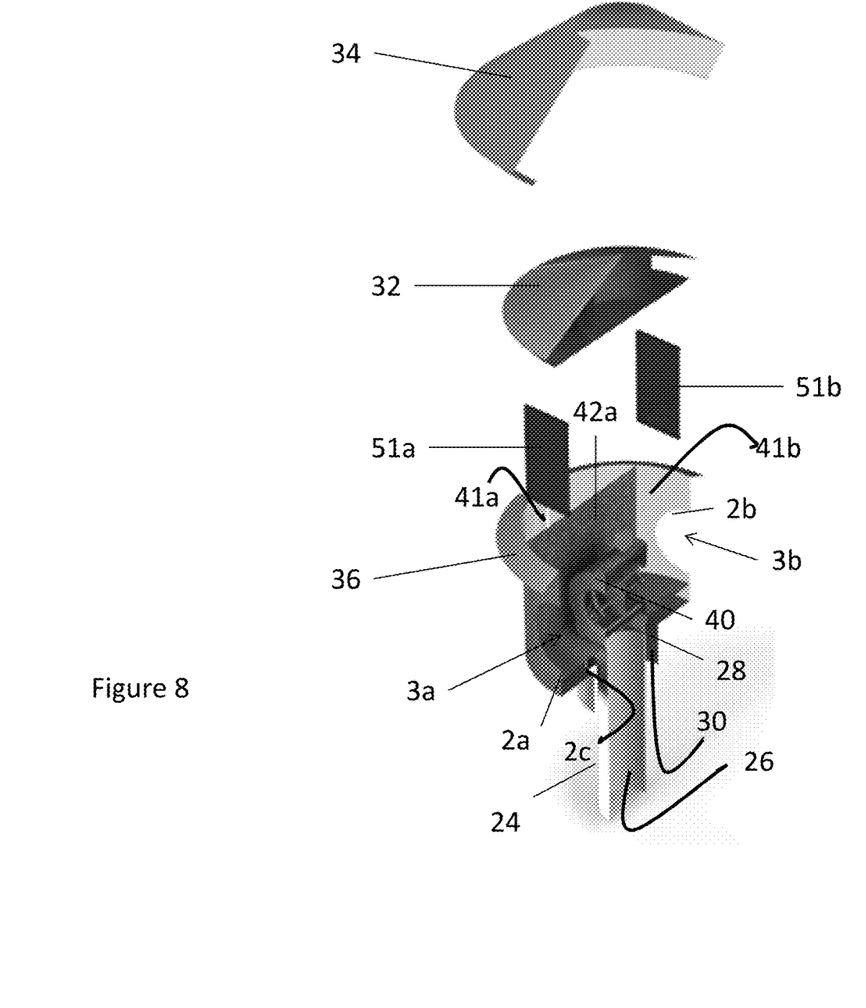
FIG. 8 is an exploded, cross-sectional, perspective view of the ventilation device of FIG. 2 with the blower device positioned in the housing.

FIG. 3 is a side-view schematic illustration of the ventilation device of FIG. 2. FIG. 5 is another side-view schematic illustration of the device of FIG. 2, however at a 90 degree rotation from the side view of FIG. 3. FIG. 8 is an exploded, perspective, cut-away view of the ventilation device 100 of FIG. 2. As shown in FIGS. 2, 3, 5, and 8, the ventilation device 100 includes a housing 15 in the form of an intake body 4 covered by an exhaust hood 8. In the illustrated embodiment, the intake body 4 defines three openings 2a, 2b (shown in FIG. 5) 2c (best seen in FIG. 8). The dual circumferential openings 2a, 2b serve as intake ports 3a, 3b for a first fluid (for example outside air intake ports) and mark the beginning of the first fluid flow path 14 (for example the outside air flow path), whereas bottom opening 2c provides an entry point for a second fluid (for example volatile chemicals) into the housing and an exit point for the first fluid (e.g. outside air) from the housing.

A first fluid exhaust conduit 24, the termination of which provides a first fluid exhaust port 26 (and marks the end of the first fluid flow path 14), is in coaxial, concentric configuration with the bottom opening 2c. A second conduit, the second fluid entry conduit 28, which defines the second fluid entry port 30 (and marks the beginning of the second fluid flow path 18), extends from the bottom of the intake body 4 and has a larger circumference than the first conduit 24 (for example, the second fluid entry conduit may extend from and have the same circumference as the bottom opening 2c.) In some embodiments, as in the illustrated embodiment, the first fluid exhaust conduit 26 extends farther below the bottom surface of the intake body 4 than the second fluid entry conduit 28.

Figure 4:
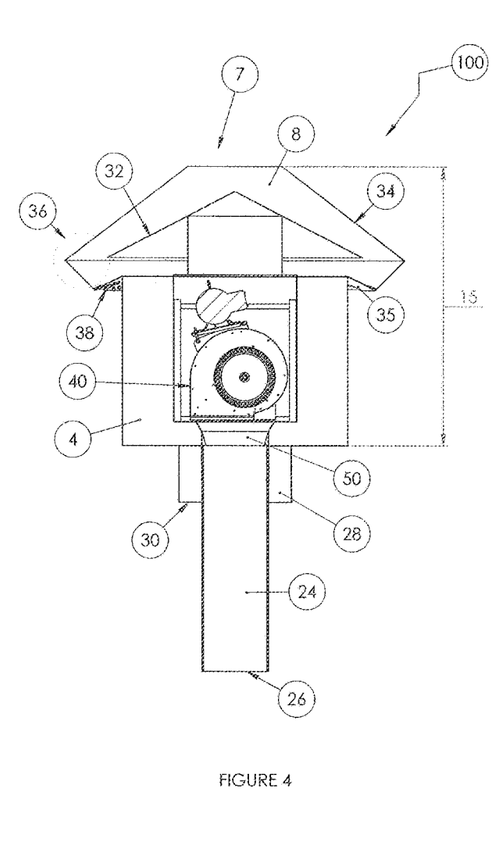
FIG. 4 is a cross-sectional side view of the ventilation device of FIG. 2 taken along the line A-A in FIG. 3.
Figure 6:
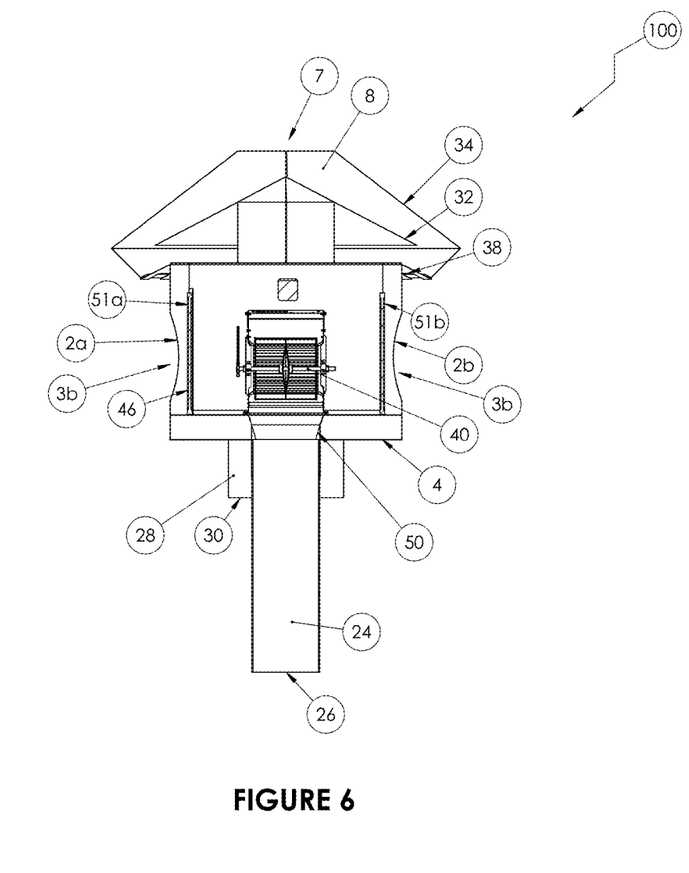
FIG. 6 is a cross-sectional view of the ventilation device of FIG. 2 taken along the line B-B in FIG. 5.

The contaminant exhaust hood 8 also defines an opening, which serves as a second fluid exhaust port 7 (and marks the end of the second fluid flow path 18). FIGS. 4, 6 (which are cut-away side views ninety degrees rotated from one another) and FIG. 8 (which is an exploded perspective view) of the ventilation device 100 of FIG. 2, illustrate further details of the exhaust hood 8. As shown, the exhaust hood 8 comprises an interior umbrella-shaped rain shield 32 within a frusto-conical chamber 34, which defines the second fluid exhaust port 7 opening. The interior umbrella-shaped rain shield 32 is sized to protect against rain water, which may enter the ventilation device 100 through the exhaust port 7, from thereafter entering the liquid-containing storage tank. For example, the circumference of the outer edge of the rain shield 32 is sized to be greater than the circumference of the air intake body 4. Accordingly, the frusto-conical chamber 34 also extends beyond the circumference of the air intake body 4, forming an eave 36. In some embodiments, the underside 35 of the eave 36 is perforated such that water that is wicked away by the rain shield 32 leaves the housing through the eave perforations 38. As is apparent from FIGS. 7 and 8, the eave 36 (and so a portion of the frusto-conical chamber 34) may be formed by a flange at the upper end of the air intake body 4.

Figure 7:
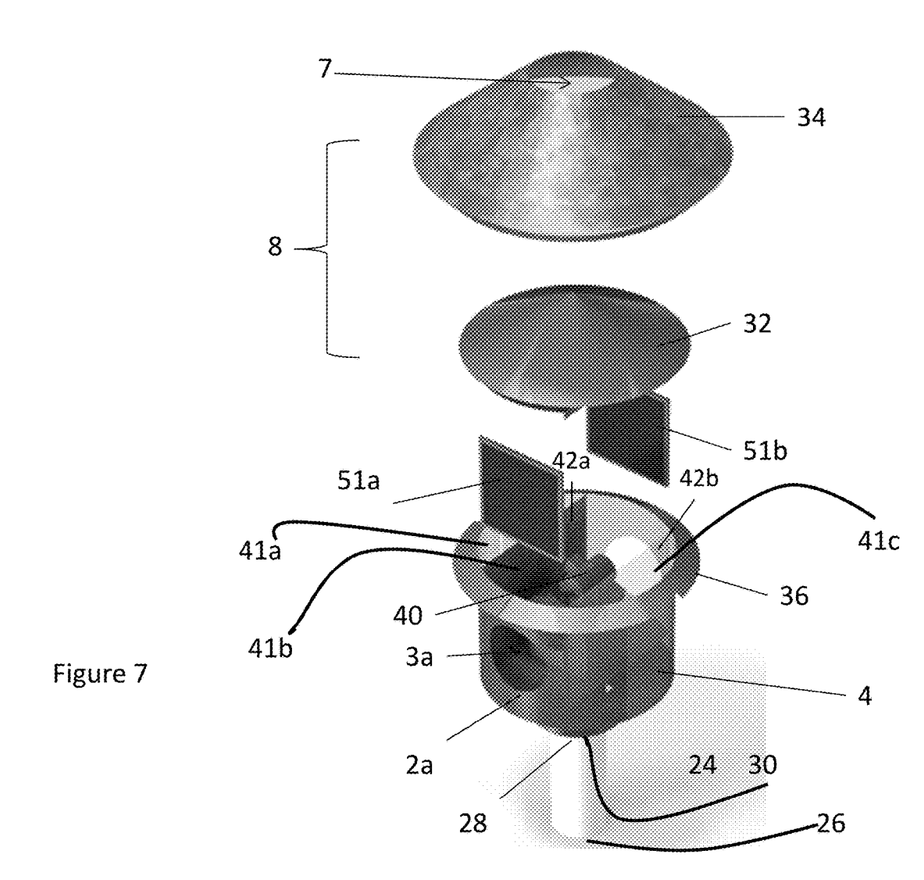
FIG. 7 is an exploded, perspective view of the ventilation device of FIG. 2.

As is best seen in FIG. 7, which is an exploded perspective view of the ventilation device 100, the intake body 4 is divided into three chambers 41a, 41b, 41c by partitions 42a, 42b. The partitions serve to physically isolate the first fluid flow path 14 from the second fluid flow path 18 in that the first fluid enters the central chamber 41b of the intake body 4 of the ventilation device 100 through dual circumferential openings 2a, 2b, whereas the second fluid enters the outside chambers 41a, 41c of the intake body 4 of the ventilation device 100 through the bottom opening 2c.

As is illustrated in FIGS. 4 and 6-9, the ventilation device 100 also includes a convection device 40 positioned within the central chamber 41b of the intake body 4. In the illustrated example, the convection device 40 is a dual intake centrifugal fan, also known as a dual intake blower or squirrel cage blower. The convection device 40 is positioned within the central chamber 41b such that each of the fan intake portions are aligned with first fluid intake ports (the circumferential openings 2a, 2b) and the fan exhaust portion is aligned with the first fluid exit point or bottom opening 2c. The fan exhaust portion is in fluid communication with the first fluid conduit 24, for example using an adaptor flange 50 (FIG. 4) which has a square end to match up with the square output on the convection device 40 and a circular end to match up with the circular end of the second fluid conduit 24.

The ventilation device 100 may also include additional features, such as screens 51a, 51b which serve as barriers against animals entering the intake body 4. As another example, the ventilation device 100 may also be internally fitted with a mist eliminator for the exhaust (not shown). In some such embodiments, the ventilation device may be used with a tank configured with internal sprayers. The sprayers may produce droplets that liberate VOCs, as well as agitating the water surface enhancing mass transfer. The sprayers may also produce a fine mist that may be carried over by the ventilation system and exhausted outside the tank. Mist eliminators (mist eliminating screens) may therefore be used to eliminate or mitigate entrainment and ejection of the fine mist. As yet a further example, the ventilation device 100 may also be fitted with diverters (not shown). In some embodiments, the diverters may facilitate directing inlet air from a horizontal plane. The ventilation device 100 may also be used together with other equipment, which may assist in ventilation such as Mixers, surface aerators, spray aerators, or bubble aerators.

Ventilation device 100 may also be installed on a top surface 11 of a water-storage tank 200. Installing the ventilation device 100 on the center of the top surface 11 of a water-storage tank 200, as shown in FIG. 9, is a convenient design choice, but installation is not limited to the illustrated embodiment. For example, the ventilation device 100 may be installed anywhere along the top surface of the water storage tank, or it may be installed in any other location so long as the ventilation device 100 is able to inject outside air at a desired velocity and at a desired angle (for example substantially perpendicularly or at any angle which includes a perpendicular vector, or predominately includes a perpendicular vector, for example the air is directed at the water surface at an angle ranging from about 30 degrees to about 90 degrees or from about 45 degrees to about 90 degrees) at the water surface in the water storage tank 200 and can pull air contaminated with volatile chemicals out from the air gap in the water storage tank 200. For example, in some embodiments, the ventilation device is mounted on a domed roof of a water tank and accordingly the ventilation device of FIG. 1 would not be attached exactly horizontally, however the air stream would be downwardly directed. In some embodiments, the angle of the air stream relative the surface of the water in the water storage tank ranges from about 30 degrees to about 90 degrees, or from about 45 degrees to about 90 degrees.

Ventilation device 100 (and ventilation device 10) may also include electronic controls, for example for turning the convection device on or off per an external command, or for automatically shutting off the convection device such as in response to actual or potential mechanical or other problems. For example, the controls may be programmed to automatically shut off the device if current draw rose or fell beyond specified levels, which may indicate any manner of mechanical problems or, as another example, if temperatures were outside a specified range.

In some embodiments, installation is accomplished by fitting the liquid-containing storage tank with an opening 205 for receiving the ventilation device 100 such that both the bottom end 26 (first fluid exhaust port) of the first conduit 24 and the bottom end 30 (second fluid intake port) of the second conduit 28 are located inside the liquid-containing storage tank 200 and the first fluid intake ports 2a, 2b and the second fluid exhaust port 7 are located outside the liquid-containing storage tank 200. The ventilation device 100 may be secured to the liquid-containing storage tank 200 using known methods, such as flanges and screws. Any gaps in the opening which may permit entry of the elements (rain, air) may be sealed, also using any known method.

When operationally attached to a water-storage tank 200 such as shown in FIG. 9, and when the convection device 40 is engaged (for example the blower is turned on), outside air is moved through the housing along the outside airflow path 14 and is exhausted through the outside air exhaust conduit 24 at an increased velocity. For example, as shown, the outside air may enter a blower in a direction that is substantially parallel to the surface of the liquid in the liquid-containing storage tank, which blower then exhausts the outside air at an increased velocity relative to the velocity of the air when it entered the blower and in a direction substantially perpendicular to the surface of the water in the liquid-containing storage tank. Without wishing to be bound by theory, it is believed that injection of outside air into the water-storage tank 200 at an appropriate direction (for example, substantially perpendicular to the surface of the water as shown in FIG. 9, or alternatively in any direction including a substantial perpendicular component such as when the angle of the air stream relative the surface of the liquid in the tank ranges from about 30 degrees to about 90 degrees) and at an appropriate velocity induces mass transfer of volatile chemicals between the liquid and air. Air, now contaminated with volatile chemicals flows into the bottom end of the volatile chemical intake port 30 along the volatile chemical flow path 18 (e.g. through the outside chambers 41a, 41b of the intake body 4 following a serpentine path around the rain shield 32 through the exhaust body 8) out of the ventilation device 100 at the top end 21a of the volatile chemical exhaust conduit 20.

The materials, dimensions and specifications of ventilation devices according to this disclosure (for example, the ventilation devices of FIGS. 1 and 2) and their components are design-specific choices that are within the expertise of a person of ordinary skill in the art based on reading this specification. With reference to embodiments wherein the ventilation devices are used to vent volatile chemicals from water-storage tanks, in one example, the length of the first (e.g. outside air exhaust) conduit and the circumference of the bottom of the first conduit (e.g. outside air exhaust port) are chosen to achieve at least a minimum desired injection velocity and may also depend on the size of the liquid-containing storage tank to be vented and convection device specifications. In some embodiments, the first conduit may be sized such that it is sometimes submerged beneath the surface of the liquid in the storage tank and the ventilation device is only engaged when the surface of the liquid falls below the bottom end of the first conduit. In other embodiments, the length of the first conduit may be sized to exhaust air at a distance from the liquid-air interface that is compatible with generating sufficient air velocity across the surface of the liquid in the storage tank to achieve a desired mass transfer rate; for example, in some embodiments, the length of the first conduit may be sized to exhaust air within a few feet from the surface of the water, or at least about 3 feet or more from the surface of the liquid in the liquid-containing storage tank. In some embodiments, the length of the first conduit ranges from about 12 inches to about 240 inches in length and the circumference of the first conduit ranges from about 4 inches to about 48 inches in diameter.

As another example wherein the ventilation devices are used to vent volatile contaminants from water-storage tanks, the distance between the bottom of the first conduit (air exhaust port) and the bottom of the second conduit (volatile chemical intake port) may be chosen such that volatile contaminant-containing air within the water-storage tank (in the air gap above the surface of the liquid) is preferentially exhausted into the housing 15 from the water-storage tank as opposed to the freshly-delivered outside air. For example, in some embodiments, the distance between the bottom of the outside air exhaust conduit and bottom of the volatile contaminant conduit is such that when the ventilation device is engaged and operational, air contaminated with volatile contaminants predominately enters the volatile contaminant conduit. In some embodiments, the distance is such that air contaminated with volatile contaminants preferentially enters the volatile contaminant conduit as opposed to air which is freshly delivered into the air gap by the convection device. In some embodiments, the length of the outside air exhaust conduit may be chosen to exhaust outside air at a distance from the surface of the air-water interface in the water-storage tank when the liquid in the tank is at maximum fill level that is compatible with generating sufficient air velocity across the surface of the liquid to achieve a desired mass transfer rate; whereas the length of the volatile contaminant conduit is designed to be significantly shorter than the length of the outside air exhaust conduit (for example extending only minimally into the water-storage tank) to create separation between air including volatile contaminants and the newly delivered air (which may be free of or relatively free of volatile contaminants). For example, in some embodiments, the length of the outside air exhaust conduit may be chosen to deliver outside air into the water-storage tank at a distance of within a few feet from the surface of the liquid, or sfrom at least about 3 feet from the surface of the water. In some embodiments, the distance between the bottom of the air exhaust conduit and volatile contaminant conduit may range from about 12 inches to about 240 inches.

As another example, a person of skill understands that the convection device is not limited to a centrifugal fan but may be any device capable of moving air from one location to another along an airflow path. In some embodiments, the air convection device (for example the fan) is chosen such that when the ventilation device 10, 100 is operationally attached to a liquid-storage tank, the convection device 10, 100 exhausts air at a desired velocity and desired direction (for example, at a velocity and direction that results in a desired mass transfer rate at the air-liquid interface facilitating the removal of volatile chemicals within the liquid in the tank). For example, to remove chloroform from drinking water in a million gallon storage tank with an average daily turn-over of 100,000 gallons, air exchange of 1,000 cfm should be sufficient to achieve a 30% increase in the mass transfer rate of chloroform out of the water. Examples of suitable convection devices for use with water-storage tanks include centrifugal supply blowers and centrifugal supply fans.

The components of the ventilation devices according to this disclosure, such as ventilation device 10 of FIG. 1 or ventilation device 100 of FIG. 2, can be made of any suitable material such as metal, rubber and plastic. In some embodiments, wherein the ventilation device is used outdoors, the materials are chosen for durability to weather. In some or additional embodiments, the materials are chosen to be inert to the volatile contaminants.

EXAMPLE

Figure 10:
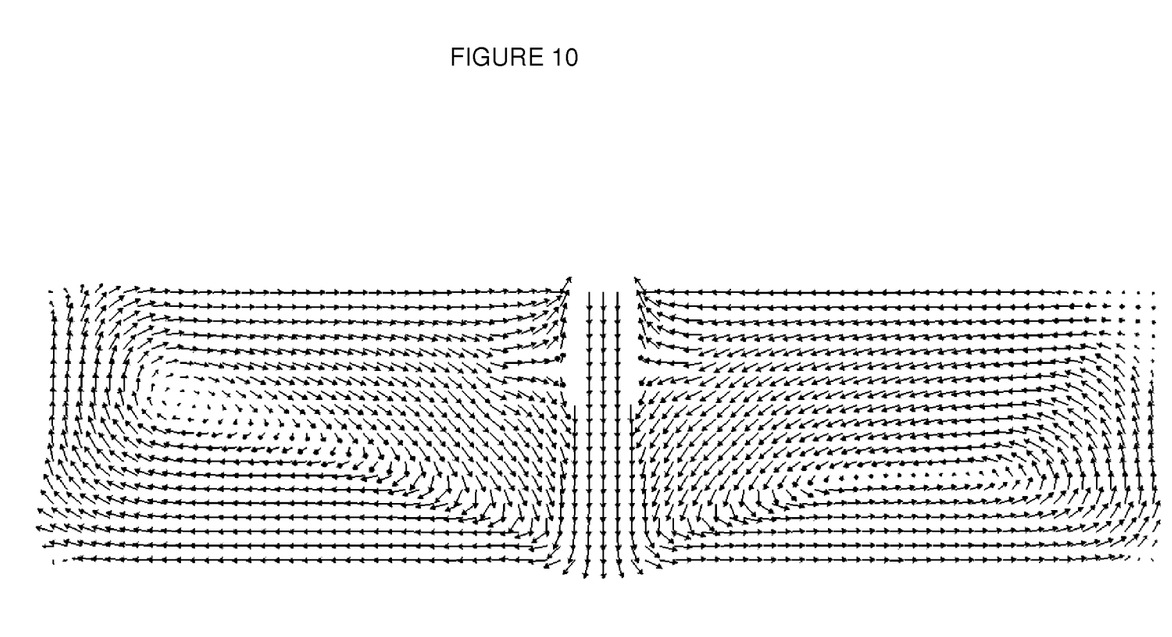
FIG. 10 illustrates a mathematical model (computational fluid dynamics simulation) of airflow inside a tank with the ventilation device showing velocity vectors.

We performed computational fluid dynamics ("CFD") studies of forced air circulation inside a water storage tank to evaluate the proposed invention. These calculations utilize massively parallel computer calculations to solve the Navier Stokes equations that govern fluid flow and numerically calculate the flow of air at all locations within the tank. Referring to FIG. 10, our results show that introduction of 1,000 cfm of air into the tank from a 12" tube in a downward direction onto the water surface created air velocities across most of the water surface in excess of 40 cm/sec. More specifically, the calculations show velocities up to 8 m/s impinging on the surface of the liquid, with velocities slowing to 0.5 m/s across most of the surface of the liquid. This velocity is sufficient to increase the rate of mass transfer of volatile compounds out of the water and into the air by at least 20%. The calculations also show that complete air circulation in the headspace of the tank is achieved by the ventilation device.

Although a few example embodiments have been described in detail above, those skilled in the art will readily appreciate that many modifications are possible in the example embodiments without materially departing from this invention. For example, although in the illustrated embodiments outside air is exhausted into the liquid-containing tank in a plane perpendicular to the surface of the air-liquid interface in the liquid-containing tank, the ventilation device could be modified to exhaust outside air at other angles relative to the surface of the air-liquid interface. For example, in some embodiments outside air could be exhausted in the direction of the air-liquid interface at any angle which has a substantial downward vector, such as 30 degrees or more from horizontal, or 45 degrees or more from horizontal. It will be appreciated by those skilled in the art that changes could be made to the embodiments described above without departing from the broad inventive concepts thereof. It is understood, therefore, that this disclosure and the inventive concepts are not limited to the particular embodiments disclosed, but are intended to cover modifications within the spirit and scope of the inventive concepts including as defined in the appended claims. Accordingly, the foregoing description of various embodiments does not necessarily imply exclusion. For example, "some" embodiments or "other" embodiments may include all or part of "some", "other," "further," and "certain" embodiments within the scope of this invention. Additional examples of devices and methods within the scope of the disclosure include the below embodiments.

1. A device for removing volatile chemicals from stored liquid in a liquid-containing tank, comprising:
   a. a housing;
   b. an air intake system at least partially within the housing comprising an outside air entry port for allowing outside air to enter the device; an outside air exit port for allowing the outside air to exit the device; and wherein the air intake system is configured for moving outside air through the housing from the first outside air entry port to the second outside air exit port along an outside air flow path such that the outside air exits the housing at a desired velocity and in a desired direction; and,
   c. a volatile chemical exhaust system also at least partially within the housing comprising a volatile chemical entry port to allow volatile chemicals to enter the device; a volatile chemical exit port to allow volatile chemicals to exit the device; and wherein the volatile chemical exhaust system is configured to move volatile chemicals through the housing from the first volatile chemical entry port to the second volatile chemical exit port along a volatile chemical flow path, which is physically isolated from the outside air flow path.
2. A device according to embodiment 1 wherein the desired velocity and the desired direction are chosen to achieve a desired mass transfer rate of outside air with volatile chemicals at an air-liquid interface in the liquid-containing tank when the housing is operatively attached to the liquid-containing tank.
3. A device according to embodiments 1 or 2, wherein the desired direction ranges from about 30 degrees to about 90 degrees relative to an air-liquid interface in the liquid-containing tank when the housing is operatively attached to the liquid-containing tank.
4. A device according to embodiment 3, wherein the desired direction is substantially perpendicular to the air-liquid interface in the liquid-containing tank when the housing is operatively attached to the liquid-containing tank.
5. A device according to any of embodiments 1-4 in which the outside air exit port and the volatile chemical entry port are in a concentric configuration, with the outside air exit port located interior to the volatile chemical entry port.
6. A device according to embodiment 1, wherein the device is configured such that a stream of outside air entering the device through the outside air intake system and a stream of air contaminated with volatile chemicals exiting the device from the volatile chemical exhaust system are not coplanar.
7. A device according to embodiment 6, wherein the outside air enters the device horizontally and the air contaminated with volatile chemicals exits the device vertically.
8. A device according to any of embodiments 1-6, wherein the air intake system further comprises a blower device which facilitates movement of outside air from the outside air entry port through the housing and to the outside air exit port.

9. A device according to embodiment 8, wherein the blower device is a centrifugal fan.
10. A device according to any of embodiments 1-9, wherein the housing is configured to sit on a top surface of the liquid-containing tank and to provide an outside air flow path in which the outside air moves into the housing along a substantially horizontal path and exits the housing into the liquid-containing tank along a substantially perpendicular path.
11. A device according to any of embodiments 1-10, wherein the housing further comprises a rain shield.
12. A device according to embodiments 8 or 9, in which the outside air exit port and the volatile chemical entry port are in a concentric configuration, with the outside air exit port located interior to the volatile chemical entry port, and further wherein the device also comprises a first conduit attached to an exhaust end of the blower device which protrudes outside the housing and defines the outside air exit port, and a second conduit with a larger diameter than the first conduit which also protrudes outside the housing but to a lesser degree than the first conduit.
13. A method for removing volatile chemicals from a liquid stored in a liquid-containing tank, comprising attaching a device according to any of embodiments 1-12 to the liquid-containing tank in a manner that provides fluid communication between the housing and an air-liquid interface in the liquid-containing tank, and engaging the blower.
14. A method for removing volatile chemicals from liquid stored in a liquid-containing tank, comprising blowing outside air through a ventilation device along an outside air flow path and into the liquid-containing tank at a desired velocity and in a desired direction, and removing volatile chemicals from the liquid-containing tank through the ventilation device along a volatile chemical flow path, wherein the outside air flow path and volatile chemical flow path are physically isolated in the ventilation device and wherein the desired direction has a substantial downward vector relative to an air-liquid interface within the liquid-containing tank.
15. A method according to embodiment 14, wherein the desired direction ranges from about 30 degrees to about 90 degrees relative to an air-liquid interface surface in the liquid-containing tank when the housing is operatively attached to the liquid-containing tank.
16. A method according to embodiments 14 or 15, wherein the desired velocity is a velocity sufficient for exchanging at least a portion of the outside air with at least a portion of volatile chemicals present in liquid in the liquid-containing tank when the air is directed at an air-liquid interface in the liquid-containing tank in the desired direction.
17. A method according to any of embodiments 14-16, wherein the desired velocity and desired direction are chosen to achieve a desired rate of mass transfer of volatile chemicals from liquid in the liquid-containing tank to air in a headspace portion of the liquid-containing tank.
18. A method according to any of embodiments 14-17, wherein the device is configured to intake air in a first direction and configured to exhaust air contaminated with volatile chemicals in a second direction, and the first direction and second direction are not coplanar.

What is claimed is:
1. A device for removing volatile chemicals from stored liquid in a liquid-containing tank, comprising:
   a. a housing;
   b. an air intake system at least partially within the housing comprising an outside air entry port for allowing outside air to enter the device; an outside air exit port for allowing the outside air to exit the device; and wherein the air intake system is configured for moving outside air through the housing from the outside air entry port to the outside air exit port along an outside air flow path such that the outside air exits from the housing at a desired velocity and in a desired direction; and,
   c. a volatile chemical exhaust system also at least partially within the housing comprising a volatile chemical entry port to allow volatile chemicals to enter the device; a volatile chemical exit port to allow volatile chemicals to exit the device; and wherein the volatile chemical exhaust system is configured to move volatile chemicals through the housing from the volatile chemical entry port to the volatile chemical exit port along a volatile chemical flow path, which is physically isolated from the outside air flow path;
wherein: the device is configured such that a stream of outside air entering the device through the air intake system and a stream of air contaminated with volatile chemicals exiting the device from the volatile chemical exhaust system are not coplanar; the air intake system further comprises a blower device which facilitates movement of outside air from the outside air entry port through the housing and to the outside air exit port; and, the outside air exit port and the volatile chemical entry port are in a concentric configuration, with the outside air exit port located interior to the volatile chemical entry port, and further wherein the device also comprises a first conduit attached to an exhaust end of the blower device which protrudes outside the housing and defines the outside air exit port, and a second conduit with a larger diameter than the first conduit which also protrudes outside the housing but to a lesser degree than the first conduit.

2. A device according to claim 1 wherein the desired velocity and the desired direction are chosen to achieve a desired mass transfer rate of outside air with volatile chemicals at an air-liquid interface in the liquid-containing tank when the housing is operatively attached to the liquid-containing tank.

3. A device according to claim 1, wherein the desired direction ranges from about 30 degrees to about 90 degrees relative to an air-liquid interface in the liquid-containing tank when the housing is operatively attached to the liquid-containing tank.

4. A device according to claim 3, wherein the desired direction is substantially perpendicular to the air-liquid interface in the liquid-containing tank when the housing is operatively attached to the liquid-containing tank.

5. A device according to claim 1, wherein the outside air enters the device horizontally and the air contaminated with volatile chemicals exits the device vertically.

6. A device according to claim 1, wherein the blower device is a centrifugal fan.

7. A device according to claim 1, wherein the housing is configured to sit on a top surface of the liquid-containing tank and to provide an outside air flow path in which the outside air moves into the housing along a substantially horizontal path and exits the housing into the liquid-containing tank along a substantially vertical path.

8. A device according to claim 7, wherein the housing further comprises a rain shield.

* * * * *